United States Patent [19]

Harold

[11] Patent Number: 5,242,254
[45] Date of Patent: Sep. 7, 1993

[54] CONTAINERS

[75] Inventor: George Harold, Lydiate, United Kingdom

[73] Assignee: CarnaudMetalbox plc, Worchester, England

[21] Appl. No.: 968,273

[22] Filed: Oct. 29, 1992

Related U.S. Application Data

[62] Division of Ser. No. 546,231, Jun. 29, 1990, Pat. No. 5,178,297.

[30] Foreign Application Priority Data

Jun. 30, 1989 [GB] United Kingdom ............... 8915112

[51] Int. Cl.$^5$ .................... B23K 1/18; B21D 51/32
[52] U.S. Cl. .................... 413/21; 228/137; 228/224; 228/57
[58] Field of Search ........... 413/21, 57, 7, 3, 4, 413/6; 228/17.5, 136, 137, 168, 169, 223, 224, 60

[56] References Cited

U.S. PATENT DOCUMENTS

| | | |
|---|---|---|
| 243,232 | 6/1881 | Fancher ............... 228/137 |
| 431,933 | 7/1890 | Brooks ............... 413/21 |
| 875,507 | 12/1907 | Daugherty ............... 413/21 |
| 1,389,900 | 9/1921 | Robinson . |
| 1,478,782 | 12/1923 | Dewey et al. . |
| 1,667,888 | 5/1928 | Graham . |
| 1,816,440 | 7/1931 | Moore . |
| 1,918,197 | 7/1933 | Sebell ............... 228/224 |
| 2,591,994 | 4/1952 | Alexander ............... 228/137 |
| 2,906,640 | 9/1959 | Bartlett . |
| 3,263,636 | 8/1966 | Smith . |
| 3,295,485 | 1/1967 | Gedde . |
| 4,258,855 | 3/1981 | Gordon . |
| 4,520,940 | 6/1985 | Boyd et al. . |

FOREIGN PATENT DOCUMENTS

| | | |
|---|---|---|
| 31069/57 | 10/1959 | Australia . |
| 50650 | 8/1889 | Fed. Rep. of Germany . |
| 506711 | 8/1930 | Fed. Rep. of Germany . |
| 8711650[U] | 8/1987 | Fed. Rep. of Germany . |
| 373025 | 3/1907 | France . |
| 2312353 | 5/1976 | France . |
| 195040 | 1/1938 | Switzerland . |
| 502925 | 3/1939 | United Kingdom . |
| 547229 | 8/1942 | United Kingdom . |
| 627428 | 8/1949 | United Kingdom . |
| 685597 | 1/1953 | United Kingdom . |
| 749707 | 5/1956 | United Kingdom . |
| 984491 | 2/1965 | United Kingdom . |
| 1545925 | 5/1979 | United Kingdom . |
| 2014478A | 8/1979 | United Kingdom . |
| 86/00842 | 2/1986 | World Int. Prop. O. . |

OTHER PUBLICATIONS

German Journal—Industrie Anzeiger, Essen, 102 No 31, Apr. 18, 1961.

Primary Examiner—Bruce M. Kisliuk
Assistant Examiner—Jack Lavinder
Attorney, Agent, or Firm—Malcolm B. Wittenberg

[57] ABSTRACT

An end wall 9, for attachment to a container, has a central panel 10 and surrounded by a channel portion 11 which includes a deposit of solder 19 in the form of a paste of solder and flux. The can end 9 is joined by a double seam 23 to a sidewall 12 of a container body. Heating of the double seam melts the solder to create a soldered joint between the end wall and sidewall. The invention is to be used in the manufacture of containers requiring strong double seams and may be used to make containers for carriage of dangerous goods. Apparatus for applying solder pastes to can ends is described in which paste is urged from a pot against convex surface 37 before passing through oulet nozzles 38 onto a can end.

7 Claims, 3 Drawing Sheets

CONTAINERS

This is a divisional of application Ser. No. 07/546,231, filed Jun. 29, 1990 now U.S. Pat. No. 5,178,297.

This invention relates to a method and apparatus for applying a solder and flux to an article, such as a can end, before the article is mechanically engaged with another article, such as a can body, and heated to create a soldered seam. More particularly but not exclusively the invention also relates to a can end comprising a central panel and a peripheral seam margin having a deposit of a paste of solder and flux on the margin.

Great numbers of rectangular cans are made by fixing a rectangular can end to tubular body of complementary rectangular cross section by means of a double seam. Solder is then applied externally to the double seam at each end of the tubular body to create an hermetic seal. One example is the 9¼" square tins used for long term storage of biscuits; another example is the oblong can used for carriage of one gallon of fluid such as paraffin. The apparatus used for the 9¼" square tins comprised a long trough of molten solder into which the double seam was dipped by progressive rotation to immerse each straight seam portion: The apparatus occupied a considerable factory floor area and required operator vigilance to ensure production of satisfactory seams. Furthermore, immersion of the double seam raised the temperature of the body and can end to a temperature at which adjacent protective finishes (varnish or paint) on the body could be scorched, so it was customary to leave fairly wide margins of uncoated metal near the double seams. These margins became covered in solder and sometimes became unsightly due to flux residues. A significant amount of solder was wasted as an exterior coating on the seam which gave no strength or sealing effect in the double seam.

Swiss Patent 1950430 (WANDER) describes manufacture of can ends having a circumferential groove charged with solder metal. The side wall of a tubular body was entered into the presoldered groove and the assembly was heated to achieve a soldered seam but there is no mention of flux which we believe essential to achieve a reliable soldered seam when using modern tinplates that have thin tin coatings.

Our objective is to provide a presoldered can end that will avoid waste of solder and we have found that application of a paste of solder and flux to the seam margin of a can end permits double seaming to mechanically engage the paste with both the sidewall and the seam margin of the can end so that application of heat achieves an efficient soldered double seam that qualifies the container for carriage of dangerous goods in class II, one of the tests is a drop test in which the filled soldered container is dropped from a height of 3 meters onto a hard surface.

Problems to be overcome included:
a) selection of a suitable solder paste; and
b) design of apparatus to place the paste on the can end.

British Patent No 794584 describes apparatus comprising a reservoir having and array of apertures in the floor that are opened and closed by a plate to apply an array of deposits of lining compound to the seam margin of rectangular can ends. Typical lining compounds used in this apparatus are organosols or plastisols of polyvinyl chloride. Whilst this apparatus has worked well with organosols and plastisols which are substantially homogeneous we have found difficulty in adapting the apparatus to flux because the disparatic density of heavier solder in the flux. Furthermore, any crushing of the pastes, at valve members or nozzles or the like, can cause the solder particles to agglomerate to block the appertures.

French Patent No. 373025 (WILZIN) describes apparatus for applying a paste or mastic to the ends or lids of metal cans to ensure tightness of seams connecting the lids or ends to a can body. The apparatus comprised a container for the paste, a heavy piston pressing on the surface of the paste in the container, and a funnel shaped lower end of the container closed by a stopper which was movable from the funnel, to define with the open end of the funnel shaped lower end, an annular exit for the paste. WILZIN used a lifter plate to raise a can end to push the stopper to its open position. This apparatus is not suitable for dispensing solder pastes because the pressures arising at the stopper/funnel on closure can crush the solder particles into agglomerates that block the exit so our problem of providing a dispensing system for solder paste that does not become blocked is not solved.

In a first aspect this invention provides a method of manufacturing metal cans or like containers having an end wall joined to a tubular side wall by a soldered seam by the steps of:
a) providing an end wall having a peripheral channel portion;
b) applying to the interior of the channel portion a deposit of solder;
c) entering the free edge of the tubular body into the channel; and
d) heating the channel portion to melt the solder to create a soldered seam joining the body to the end wall, characterised in that, in step (b) the solder is applied as a part of a solder and a flux.

Whilst the paste may be deposited as a continuous annulus around the can end it is preferable to apply the paste as an array of localised deposits around the channel portion of rectilinear can ends.

Preferably, in step (c) of the method, a double seam is formed to mechanically join the tubular side wall to the tubular side wall to the channel portion before heat is applied in step (d).

The method is applicable to various shapes of can end and body such as round, rectilinear or oval. If desired the viscosity of the paste may be controlled by heating to facilitate flow through a nozzle onto the can end. Suitable solder pastes include a solder alloy of tin and lead in a resin flux but other solder and flux pastes may be used.

In a second aspect this invention provides a container end wall comprising a peripheral channel portion having therein a deposit of a paste comprising a solder and a flux on the interior surface of the channel portion.

Preferably the can end has a peripheral cover hook, annular seaming panel, a chuck wall dependent from the seaming panel and a central panel spanning chuck wall so that the paste of solder and flux is contained within the interior surfaces of the cover hook and seaming panel.

In a further aspect this invention provides apparatus for depositing a paste of a solder in a flux into a peripheral channel portion of a metal can end or like article, said apparatus comprising a tubular pot having a movable pad therein; an end wall spanning one end of the tubular pot and defining an outlet for paste product between the pad and end wall; and means to present the can end to said outlet to receive paste, characterised in that, the end wall has an upstanding convex surface projecting towards the interior of the tubular pot and said outlet or an array of outlets is located around the upstanding convex surface.

In a preferred embodiment the pot is closed at the end by a lid having an inlet for compressed gas. The or each outlet from the pot may be defined by a nozzle to direct a deposit of paste onto the can end.

In one embodiment the upstanding convex surfaces is a pyramid surrounded by a rectangular array of outlets to deliver paste onto a rectangular can end.

In a preferred embodiment for application of paste to rectangular can ends, an internally profiled plate defines with the upstanding pyramid surface and annular passageway extending laterally from the pot towards the outlets. If desired the annular passage way may increase in width towards the outlet or outlets.

In one embodiment the inlet for compressed gas to the lid is corrected via a pressure regulater to a source of compressed gas such as air.

In a preferred apparatus a valve delivers gas pressure to the regulater and pot only when a can end is presented to the outlets. The delivery valve may be actuated by a cam which is arranged to activate the valve when a can end is presented to the outlets by a can end support means.

Various embodiments will now be described by way of example and with reference to the accompanying drawings in which:

FIG. 1 is a fragmentary section through a prior art soldered double seam;

FIGS. 2a,b,c, are perspective sketches of a rectangular top wall, oblong tubular sidewall, and a rectangular bottom wall adapted for joining by the method;

Figure 1:
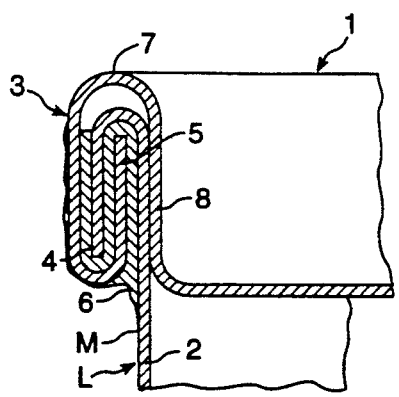

FIG. 1 shows a can end 1 joined to a tubular sidewall 2 by a double seam 3. In the double seam the metal of the sidewall bends around a "U" turn, as a body hook 4 to overlap with the peripheral cover hook 5 of the can end. The double seam 3 has been dipped into molten solder 6 which has flowed between the cover hook 5 and sidewall 2 around the "U" bend between the cover hook 5 and body hook 4, and most of the way up the gap between the body hook 4 and seaming panel 7 of the can end. However, seldom did the solder reach the interface between the chuck wall 8 and interior surface of the tubular sidewall 2 of the body. The solder also coated the exterior of the seaming panel 7 and a margin "M" of the sidewall adjacent the double seam 3. It was therefore necessary to terminate any protective or decorative organic coating on the sidewall at a level "L" some distance from the influence of soldering heat. The uncoated zone between the solder edge "M" and edge of decoration "L" was at risk of atmospheric corrosion, particularly if corrosive flux residues remained.

FIG. 2 shows components used to make an oblong can of 5 liters capacity such as may be used for a carriage of dangerous goods such as paraffin.

Figure 2A:
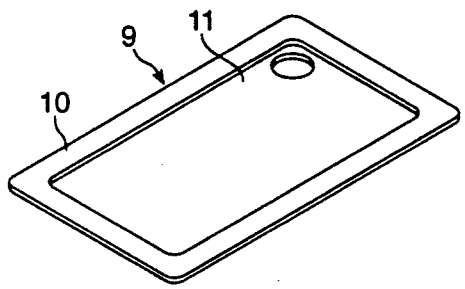

FIG. 2a shows a top wall 9 comprising a peripheral channel portion 10 spanned by a central panel 11. In the finished container an aperture is closed by a plastics collar and screw closure (not shown). A handle may be attached to the central panel.

Figure 2B:
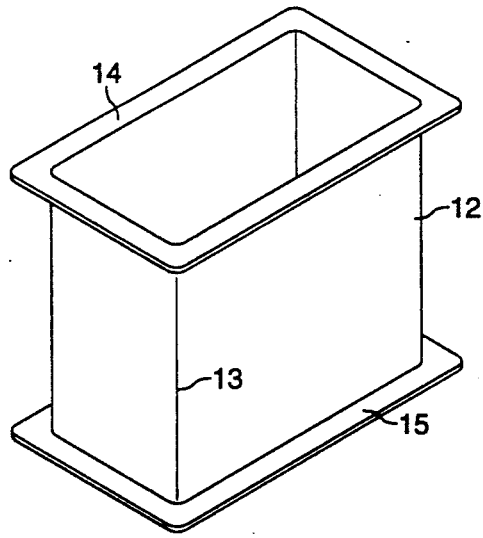

FIG. 2b shows an oblong body 12 or sidewall having a side seam 13 to complete the rectangular cross section. The sidewall has outwardly directed flanges 14,15, (body hook) at each end.

Figure 2C:
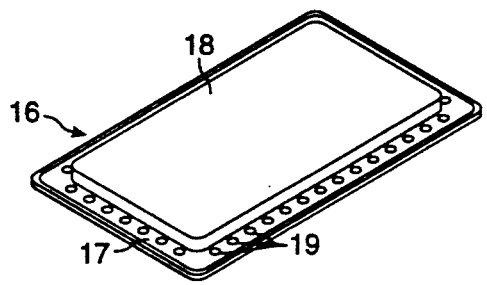

FIG. 2c shows a bottom wall 16 having a peripheral channel portion 17 spanned by a central panel 18. An array of equispaced deposits 19 of a paste of solder and flux is deposited on the interior surface of the channel portion of both the top wall 9 and the bottom wall 16 as shown in FIG. 2c. A suitable paste comprises a tin lead solder dispersed in a non-corrosive resin flux so that the paste is a viscous solid at room temperature by capable of being rendered fluid by controlled heating to permit application of a controlled amount to the channel portion. Whilst an array of localised deposits 19 is shown in FIG. 2c a continuous deposit may be applied from a nozzle if desired.

Figure 3:
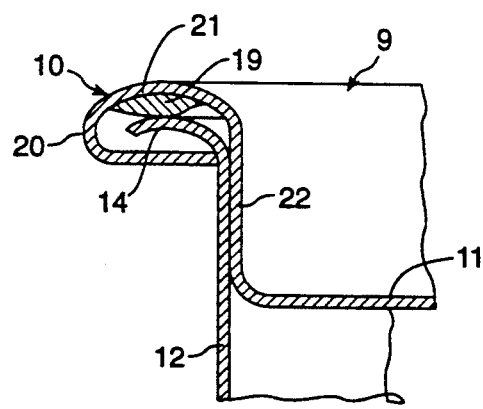
FIG. 3 is a fragmentary section through the side wall and top wall before double seaming.
Figure 4:
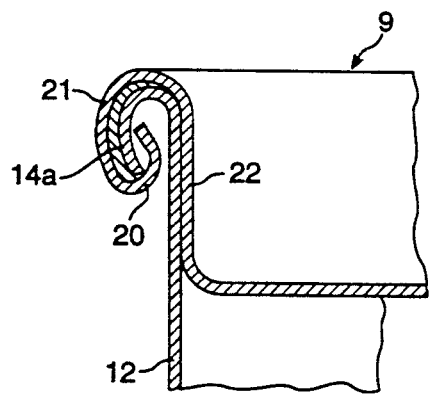
FIG. 4 is a fragmentary section of the sidewall and top wall of FIG. 3 after a first operation of double seaming.
Figure 5:
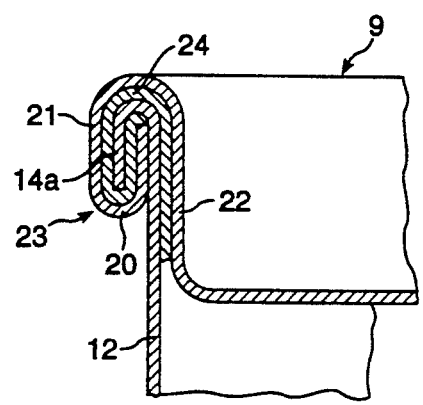
FIG. 5 is a fragmentary section of the sidewall and top wall after final double seaming and melting of the solder.

FIGS. 3, 4 and 5 show how the end walls 9, 16 of FIGS. 2a and 2c are double seamed to the tubular sidewall 12 of FIG. 2b.

In FIG. 3 the top wall 9 can be seen to comprise a channel portion 10 and a central panel 11. The channel portion 10 comprises a peripheral cover hook 20, an annular seaming panel 21, a chuck wall 22 dependent from the interior of the seaming panel. The central panel 11 spans the chuck wall 22. The tubular sidewall 12 terminates in an outwardly directed flange 14 (or body hook) which has been entered into the channel portion 10 to press against the deposits 19 of paste on the interior surface of the seaming panel.

FIG. 4 shows the sidewall 12 and top wall 9 of FIG. 3 after a first operation of double seaming carried out in conventional manner by means of a chuck which supports the chuck wall against progressive radial pressure imposed by a roll applied to the exterior of the cover hook 20. In FIG. 4 the flange 14 has been turned down to a body hook 14a substantially parallel with the sidewall 12, and the cover hook 20 has been rolled into the gap between the body hook 14a and sidewall 12.

The solder paste has been compressed between the seaming panel 21 and body hook 14a and so remains entirely within the partly formed double seam.

FIG. 5 shows the finished double seam 23 achieved by cooperation of a second operation roll with the chuck which flattens the double seam to a preferred elongate (not round) cross-section. More particularly, FIG. 5 shows how heating of the double seam has caused the solder to melt and flow to fill the seam 23 completely so that body hook 14a, cover hook 20, seaming panel 21 and some of the chuck wall 22 are all firmly bonded and sealed by solder 24.

The benefits arising from the seam shown in FIG. 5 are:

(i) controlled distribution of solder within the seam to achieve a seam with economy of solder used;

(ii) a double seam strengthened by the solder bond to achieve a seam of high seal integrity;

(iii) adequate performance in drop tests or filled containers for carriages of dangerous goods;

(iv) absence of any solder exterior to the seam so that protective finishes on the sidewall may extend right up to the double seam;

(v) a more aesthetically pleasing container achieved by much reduced solder margins. Some bare metal margins are still desirable on the sidewall material to achieve a perfect soldered joint within the seam. Although burn off of protective coatings has been relied on in prior art soldered double seams, it is not a preferred practice;

(vi) variance in tightness of double seams, such as arise in manufacture of rectangular seams, can be filled with solder.

Figures 6, 7:
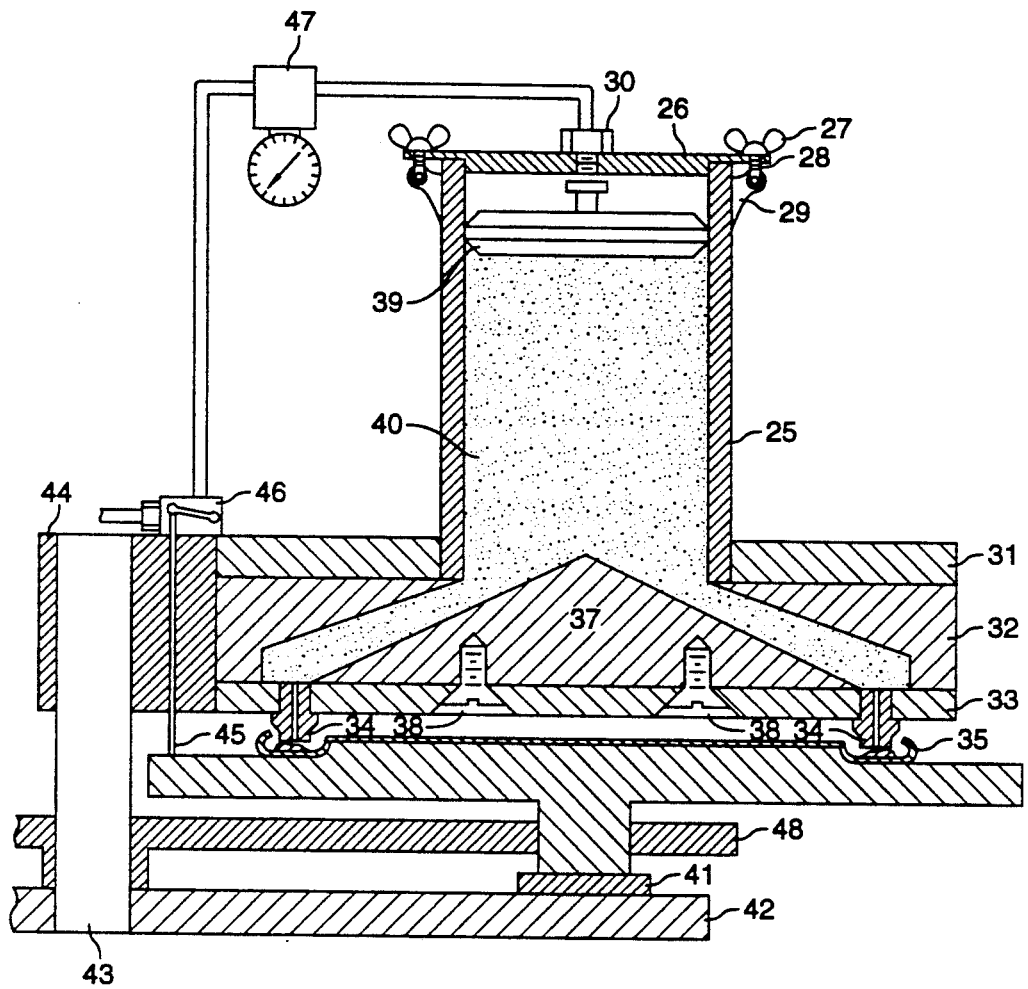
FIG. 6 is a diagrammatic sectioned side view of apparatus for depositing a solder paste onto a can end.
FIG. 7 is a plan view of a can end having deposits of solder paste.

FIG. 6 shows apparatus for applying a paste of solder and flux to a rectangular can end shown in FIG. 7. Whilst the can end of FIG. 7 is rectangular it will be understood that the apparatus may be modified to deposit paste onto other shapes of can end such as round or square.

In FIG. 6 the apparatus comprises a pressure pot 25 closed at the top by a lid 26 which is retained in the closed position by a plurality of wing nuts 27 each of which is connected to the side wall of the pot by a screw 28 pivotally connected to the wall by a bracket 29. The lid 26 has an entry union for compressed air which is delivered via a regulator with pressure gauge.

At the bottom of the pot a distributor housing comprises a flange plate 31 surrounding the lower end of the pot 25, an internally profiled plate 32 and a base plate 33. The base plate 33 has an array of nozzles 34 so arranged to deliver, to a can end 35 on a support 36, the array of deposits of paste best seen in FIG. 7.

A pyramid shaped control shield 37 is fixed to the interior surface of the base plate 33 by studs 38. The control shield 37 defines with the profiled interior surface of the plate 32 an uninterrupted path for paste from the pot 25 to the nozzle 34.

As shown in FIG. 6 a pad 39 imposes a constant load on the meniscus of the paste 40 in the pot to urge the paste towards the nozzles and also serves to reduce any risk of a skin developing on the top of the paste.

In FIG. 6 the apparatus is depicted during delivery of paste 40 onto the can end 35. The can end support has been lifted by a cam 41 on a basal member 42 of the apparatus. A pillar 43 upstanding from the basal member supports a bracket 44 to which the flange plate/profiled plate/base plate assembly is fixed by means not shown. Elevation of the can end support 36 has urged a rod 45 to actuate valve 46 to deliver compressed air to the pressure pot 25 via the regulater 47 so that regulated compressed air pressure drives the pad 39 further into the pressure pot to drive paste out of the nozzles 34 into the channel portion of the can end 35. After delivery of the deposits of paste from the nozzle the can end support 36 is lowered by rotating a turntable 48 about the pillar 43 so that the support descends on the cam surface and the support leaves the valve actuating rod 45 and the air supply valve is closed to abate delivery of paste.

In order to operate the apparatus the following steps are carried out:

a) The solder past is mixed to a suitable viscosity and placed in the pressure pot 25. If desired the viscosity may be further controlled by heating the paste in the pressure pot but this complication is not essential if a proper mix is used.

b) The constant load pad 39 is inserted in the pot on top of the past 40.

c) The lid 26 is secured tightly by means of the thumb screws to ensure even pressure on a gasket.

d) The supply of compressed air is turned on and adjusted by means of the pressure regulater to achieve delivery of the desired weight of paste at the nozzles; and e) The apparatus is then set in motion so that, as each can end support 36 on the turntable 48 is raised, an array of deposits of paste is applied to the can end on the support.

We have observed that the divergent path defined by the interior surface of the profiled plate 32 and pyramid shaped control shield 37 permits reliable delivery of paste to each can end without blocking of the nozzles 34. No separation of the solder from the flux occurs to give rise to agglomeration of solder particles or build up of dead movement in the bulk of the paste in the pot so a consistent weight of paste is deposited on each can end.

A suitable solder paste comprises powdered soldering filler metal and flux suspended in a binder. Typically, for the oblong cans described, the solder will be substantially 40% tin, 60% lead and may include 0.5% antimony. The solder is typically present as about 90% by weight of the paste, the 10% by weight being flux and binder. A non corrosive resin flux is advantageous.

However other solder formulations may be used such as the pure tin used for beverage cans or 2% tin/98% lead used for other containers.

When the hot paste is deposited onto the cold can end the paste sets to a solid, firmly held on the can end so can ends may be stacked, and conveyed without special precaution.

Whilst the invention has been described with reference to an oblong container the principles taught may usefully be applied to round or other shapes of container end wall by providing a modified profiled plate and upstanding convex surface in the apparatus.

I claim:

1. A method of manufacturing containers having an end wall joined to a free edge of a tubular body by a soldered seam by the steps of:
    a) providing an end wall having a peripheral channel portion;
    b) applying to the interior of the channel portion a deposit of solder;
    c) entering the free edge of the tubular body into the channel; and
    d) heating the channel portion to melt the solder to create a soldered seam joining the body to the end wall characterised in that in step (b) the solder is applied as a paste of solder and a flux.

2. A method according to claim 1, characterised in that the paste is applied as an array of localised deposits around the channel portion.

3. A method according to claim 1, characterised in that step (c) includes formation of a double seam to mechanically join the tubular sidewall to the channel portion before heat is applied in step (d).

4. A method according to claim 1, characterised in that the metal end wall and tubular body are round, rectilinear or oval.

5. A method according to claim 1, wherein the solder or solder paste is heated to permit flow through a nozzle onto the channel portion.

6. A method according to claim 1 wherein the solder paste comprises a solder alloy of tin and lead in a resin flux.

7. A method of manufacturing containers having an end wall joined to a free edge of a tubular body by a soldered seam by the steps of:
   a) providing an end wall having a peripheral channel portion;
   b) applying to the interior of the channel portion a deposit of a paste of solder and a flux;
   c) entering the free edge of the tubular body into the channel;
   d) forming a double seam to join the tubular sidewall to the channel portion; and
   e) heating the channel portion to melt the solder to create a soldered seam joining the body to the end wall.

* * * * *